United States Patent [19]

Amemiya

[11] Patent Number: 5,364,317
[45] Date of Patent: Nov. 15, 1994

[54] CONTROL SYSTEM FOR AUTOMOTIVE AUTOMATIC TRANSMISSION

[75] Inventor: Satoshi Amemiya, Fuji, Japan
[73] Assignee: Jatco Corporation, Fuji, Japan
[21] Appl. No.: 19,352
[22] Filed: Feb. 18, 1993

[30] Foreign Application Priority Data

Feb. 18, 1992 [JP] Japan ................................ 4-069145

[51] Int. Cl.⁵ .............................................. F16H 59/04
[52] U.S. Cl. .................................... 475/132; 477/116
[58] Field of Search ................. 475/131, 132; 477/116, 477/117

[56] References Cited
FOREIGN PATENT DOCUMENTS 62-204044 9/1987 Japan .
63-251652 10/1988 Japan .

Primary Examiner—Dirk Wright
Attorney, Agent, or Firm—Foley & Lardner

[57] ABSTRACT

A control system solves a drawback which would occur when a shift lever is returned from N-position to D-position (or any Forward position) after a previous shifting from D-position to N-position. The control system comprises a first control device for deriving and memorizing a suitable gear position of the transmission which is to be selected under a driving condition which has been assumed by the vehicle just before the return movement of the shift lever; and a second control device for forcing the transmission to take the memorized gear position upon completion of the return movement of the shift lever.

5 Claims, 6 Drawing Sheets

FIG. 2

| | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|
| D RANGE 1ST. SPEED | | | O | | | | O | O | $\dfrac{1+\alpha_2}{\alpha_2}$ | 3.027 |
| D RANGE 2ND. SPEED | | O | O | | O | | | | $\dfrac{\alpha_1+\alpha_2+\alpha_1\alpha_2}{\alpha_2(1+\alpha_1)}$ | 1.619 |
| D RANGE 3RD. SPEED | | O | O | O | | | | | 1 | 1.000 |
| D RANGE 4TH. SPEED | | | (O) | O | O | | | | $\dfrac{1}{1+\alpha_1}$ | 0.694 |
| ENGINE BRAKE 1ST. SPEED | | | (O) | | | O | (O) | (O) | | |
| ENGINE BRAKE 2ND. SPEED | | | (O) | O | O | | (O) | | | |
| ENGINE BRAKE 3RD. SPEED | | | (O) | O | O | | (O) | | | |
| ENGINE BRAKE 4TH. SPEED | | | (O) | | O | | | | | |
| REVERSE | O | | | | | O | | | $-\dfrac{1}{\alpha_1}$ | -2.272 |

CONTROL SYSTEM FOR AUTOMOTIVE AUTOMATIC TRANSMISSION

BACKGROUND OF THE INVENTION

This application has relation to U.S. patent applications Nos. 07/795,989 (filed Nov. 22, 1991), 07/850,283 (filed Mar. 12, 1992), 07/878,469 (filed May 5, 1992), 07/939,600 (filed Sep. 2, 1992), and 07/969,072 (filed Oct. 30, 1992).

1. Field of the Invention

The present invention relates in general to automotive automatic transmissions, and more particularly to a control system for the automotive automatic transmissions.

2. Description of the Prior Art

In order to clarify the task of the present invention, one conventional control system for an automotive automatic transmission will be outlined, which is disclosed in Japanese Patent First Provisional Publication 62-204044.

The control system of the publication proposes a control which is carried out when, during movement of an associated motor vehicle, a shift lever is moved, for example, from Drive (D)-position to Neutral (N)-position and then returned to the D-position. That is, in the control, when a shifting is carried out from D-position to N-position, the gear position having been taken by the transmission at the D-position is memorized, and when thereafter the shift lever is returned to D-position, the memorized gear position is instantly taken by the transmission automatically.

The conventional control system aims to solve undesired select shock which would be produced in such a return shifting and to smoothly restore the vehicle to the former driving condition.

In fact, when the time (which will be referred to as "N-position keeping time" hereinafter) for which the shift lever is kept at N-position is relatively short, satisfied result is obtained from the above-mentioned measure.

However, due to its inherent construction, the conventional control system is forced to show drawbacks when the N-position keeping time is relatively long. In fact, in this case, the shift lever returning to D-position tends to cause uncomfortable select shock and/or useless racing of the associated engine. That is, when the N-position keeping time is long, the possibility in which various factors (such as, vehicle speed, throttle valve angle, etc.,) for determining a suitable gear position of the transmission are subjected to a change tends to increase. Thus, upon the shift lever returning to D-position, it sometimes occurs that the memorized gear position fails to agree with the existing driving condition of the vehicle.

SUMMARY OF THE INVENTION

It is therefore an object of the present invention to provide a control system for an automotive automatic transmission, which is free of the above-mentioned drawbacks.

According to a first aspect of the present invention, there is provided a control system for controlling an automotive automatic transmission. The transmission is constructed to permit a return movement of a shift lever from Neutral (N)-position to a Forward-position after a movement of the same from the Forward-position to N-position. The control system comprises first means for deriving and memorizing a suitable gear position of the transmission which is to be selected under a driving condition which has been assumed by the vehicle just before the return movement of the shift lever; and second means for forcing the transmission to take the memorized gear position upon completion of the return movement of the shift lever.

According to a second aspect of the present invention, there is provided a control system for controlling an automotive automatic transmission. The transmission is constructed to permits a return movement of a shift lever from Neutral (N)-position to a Forward-position after a movement of the same from the Forward-position to N-position. The control system comprises first means for deriving and memorizing a suitable gear position of the transmission which is to be selected under a driving condition which has been assumed by the vehicle just before the return movement of the shift lever; second means for measuring the time for which the shift lever is kept at D-position after the movement of the shift lever from N-position to the Forward-position; and third means for forcing the transmission to take the memorized gear position when the measured time is shorter than a predetermined time and permitting the transmission to take a new gear position when the measured time is longer than the predetermined time, the new gear position being suitable to the existing driving condition of the vehicle taken after the return movement of the shift lever from N-position to the Forward-position.

BRIEF DESCRIPTION OF THE DRAWINGS

Other objects and advantages of the present invention will become apparent from the following description when taken in conjunction with the accompanying drawings, in which:

FIG. 2 is a TABLE showing ON/OFF (viz., engaged/disengaged) conditions of various friction elements of the automatic transmission with respect to various gear positions selected by the transmission;

DETAILED DESCRIPTION OF THE PRESENT INVENTION

Figure 1:
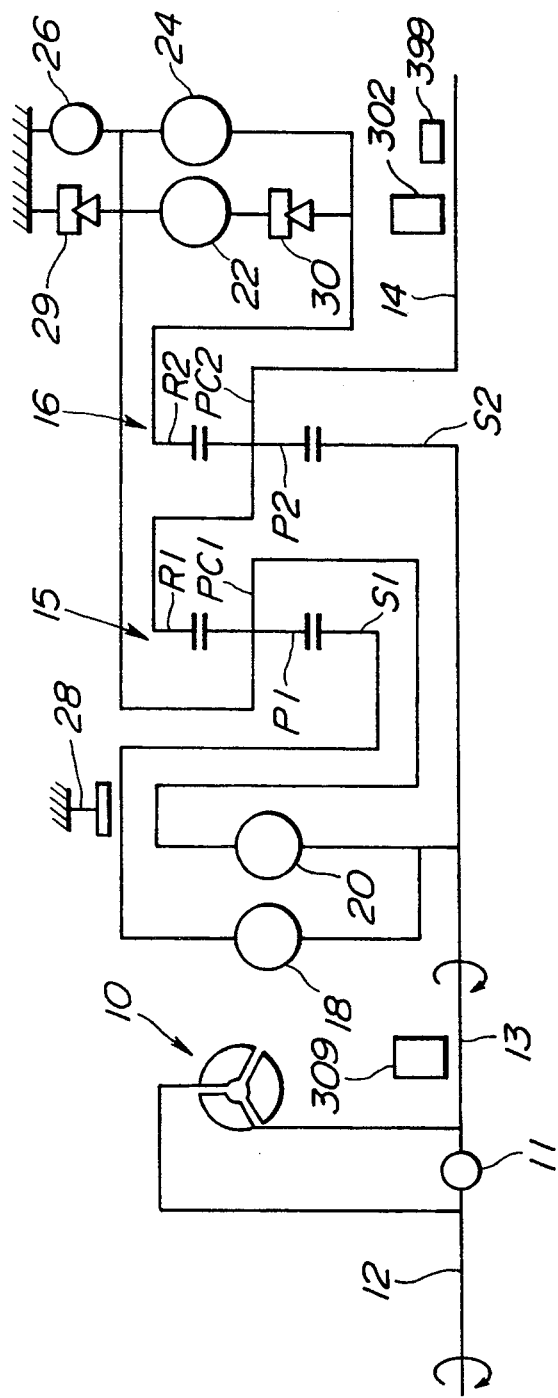
FIG. 1 is a schematic illustration of an automotive automatic transmission to which a control system of the present invention is practically applied.

Referring to the drawings, there is shown an embodiment of the present invention.

In FIG. 1, there is schematically shown an automotive automatic transmission of a type having an overdrive, four forward speeds and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown).

Between the input and output shafts 13 and 14, there are disposed, in the illustrated manner, a first planetary gear unit 15, a second planetary gear unit 16, a reverse clutch 18, a front clutch 20, a rear clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the front clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the rear clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 2 is a table showing the various gear speeds (viz., first, second, third and fourth forward speeds and a reverse) which are given by the ON/OFF (viz., engaged/disengaged) conditions of the clutches 18, 20, 22, 24, 29 and 30 and the brakes 26 and 28.

In the table, the mark "O" means "ON" or engaged condition of the associated clutch or brake and "blank" means "OFF" or disengaged condition of the same. The mark "(O)" means that the engaged condition does not participate in power transmission in the established gear speed. It is to be noted "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 3:
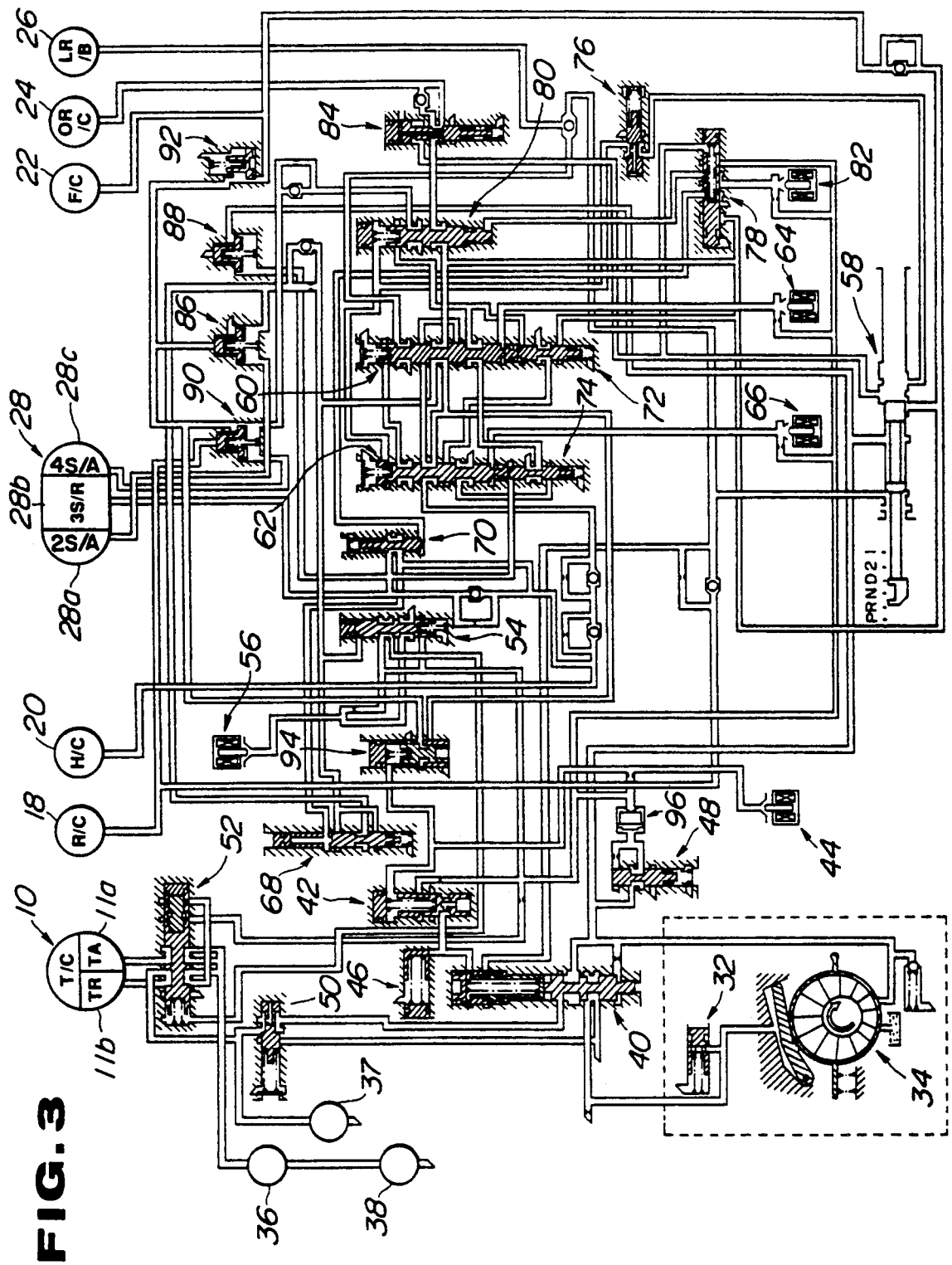
FIG. 3 is a hydraulic circuit of the automatic transmission.

FIG. 3 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the rear clutch 22, the front clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 4:
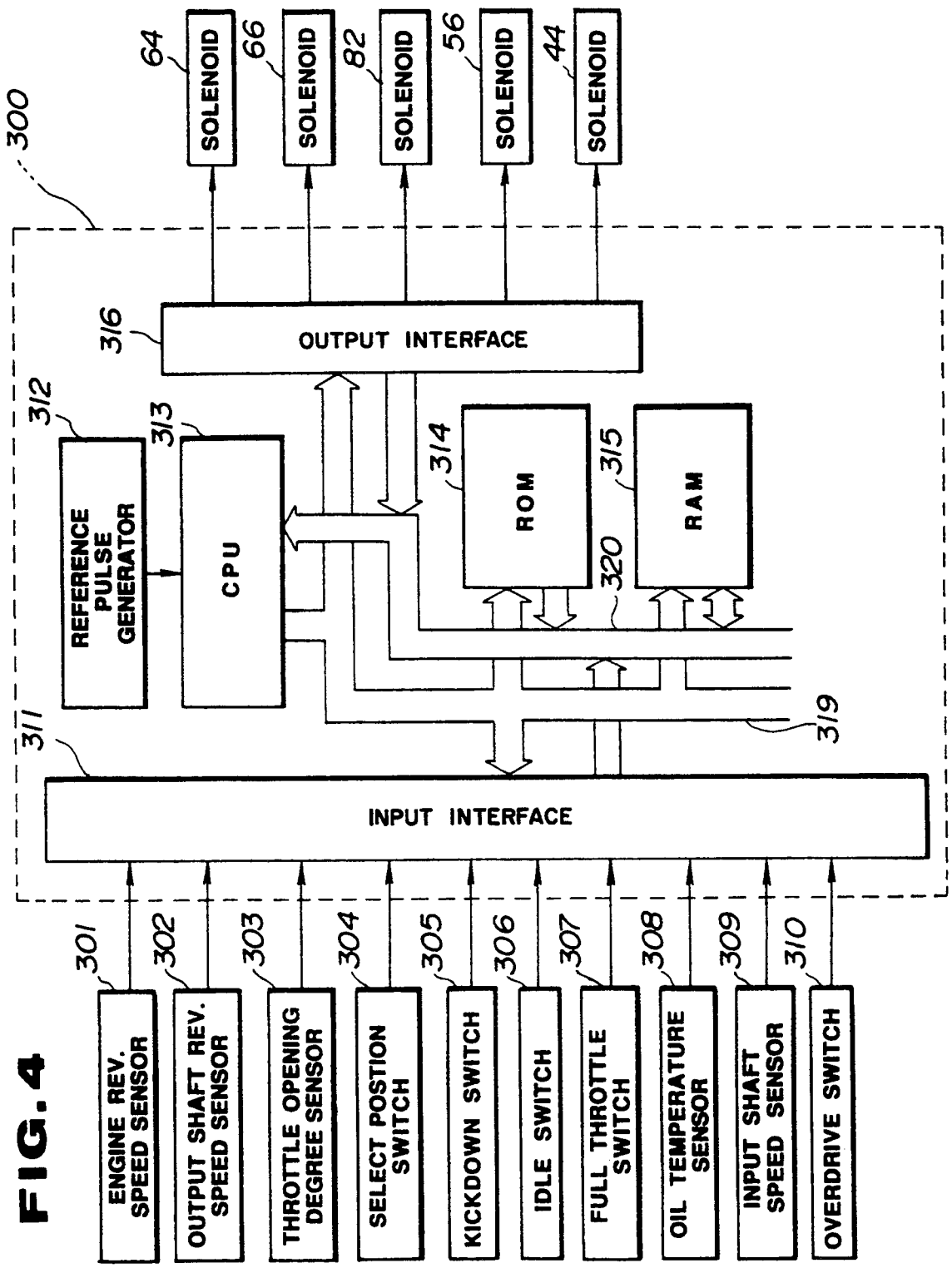
FIG. 4 is a schematic view of a control unit which constitutes an essential part of the control system of the present invention.

FIG. 4 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle valve angle sensor 303, a select position switch 304, a kick down switch 305, an idle switch 306, a full throttle switch 307, an oil temperature switch 308, an input shaft speed sensor 309 and an over-drive switch 310 are fed to the input interface 311 of the control unit 300.

Figure 5:
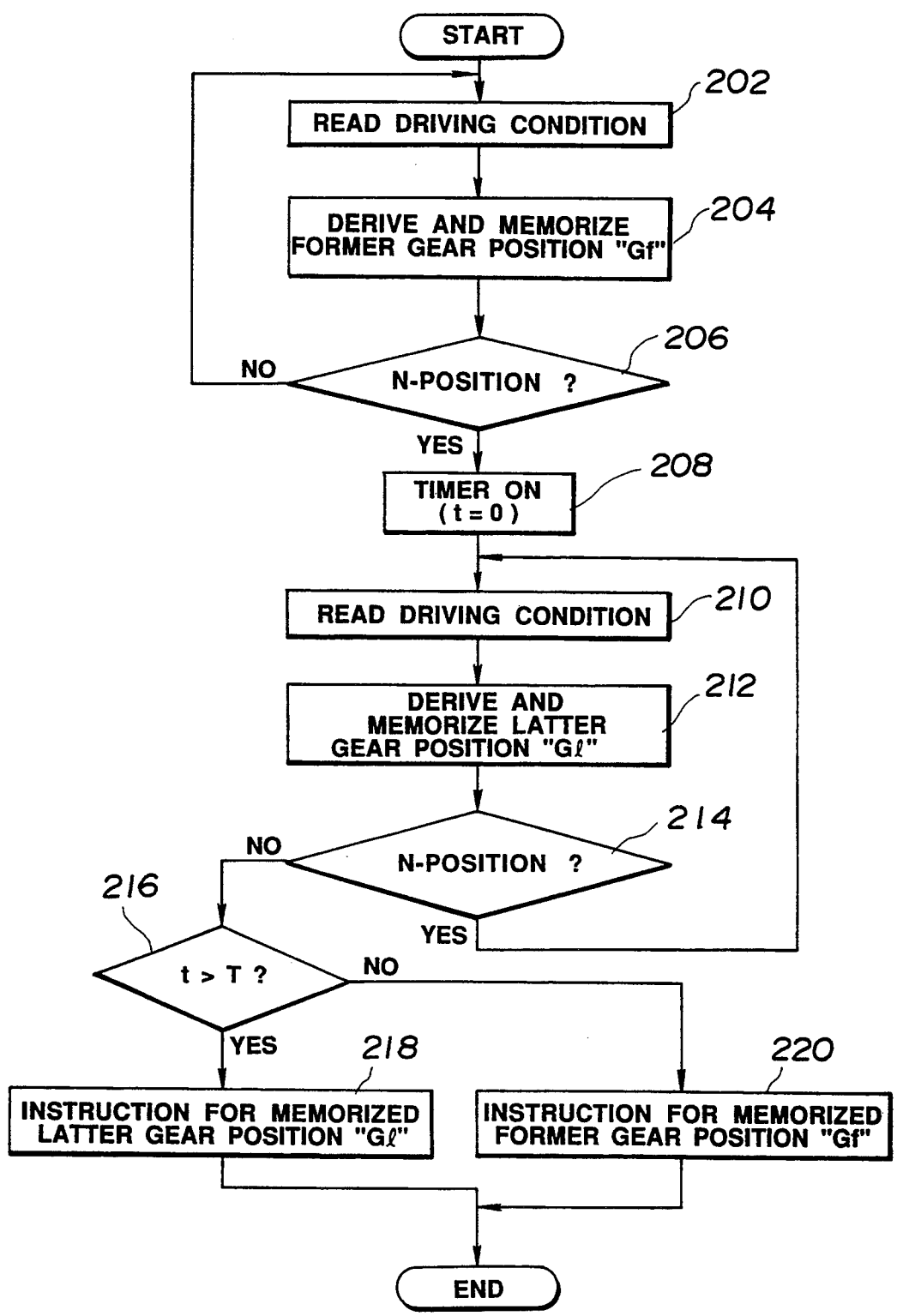
FIG. 5 is a flowchart showing operation steps which are carried out in a computer of the control unit.

The control unit 300 controls the automatic transmission in such a manner as is depicted in the flowchart of FIG. 5.

At step 202, the driving condition of the vehicle at the D→N shifting is read. That is, values of various factors, such as vehicle speed, throttle valve angle, etc., which have been taken at the D→N shifting are read. Then at step 204, from the values of the various factors thus read at step 202, a former gear position "Gf" which has been taken before that D→N shifting is derived and memorized. Then, at step 206, a judgement is carried out as to whether the shift lever is left at N-position or not. If NO, that is, when the shift lever has been returned to D-position, the operation flow returns back to step 202. If YES a step 206, that is, when the shift lever is left at N-position, the operation flow goes to step 208 where a timer starts to count the time "t". Then, the operation flow goes to step 210 where the current driving condition of the vehicle is read in such a manner as stated in the step 202. Then, at step 212, from the driving condition read at step 210, a latter gear position "$G_l$" suitable for the current driving condition is derived and memorized. Then, at step 214, a judgement is carried out as to whether the shift lever is left at N-position or not. If YES, that is, when the shift lever is left at N-position, the operation flow returns back to step 210. If NO at step 214, that is, when the shift lever has been returned to D-position, the operation flow goes to step 216 where a judgement is carried out as to whether the time "t" exceeds a predetermined time "T" or not. If YES, that is, when the shift lever has been kept at N-position for a relatively long time, the operation flow goes to step 218 where an instruction is issued for forcing the transmission to take the latter gear position "$G_l$". While, if NO at step 216, that is, when the shift lever has been kept at N-position for a relatively short time, the operation flow goes to step 220 where an instruction is issued for forcing the transmission to take the former gear position "$G_f$".

It is to be noted that the predetermined time "T" is so selected as to obtain a smoothed restoring of the vehicle which is under running.

Figure 6:
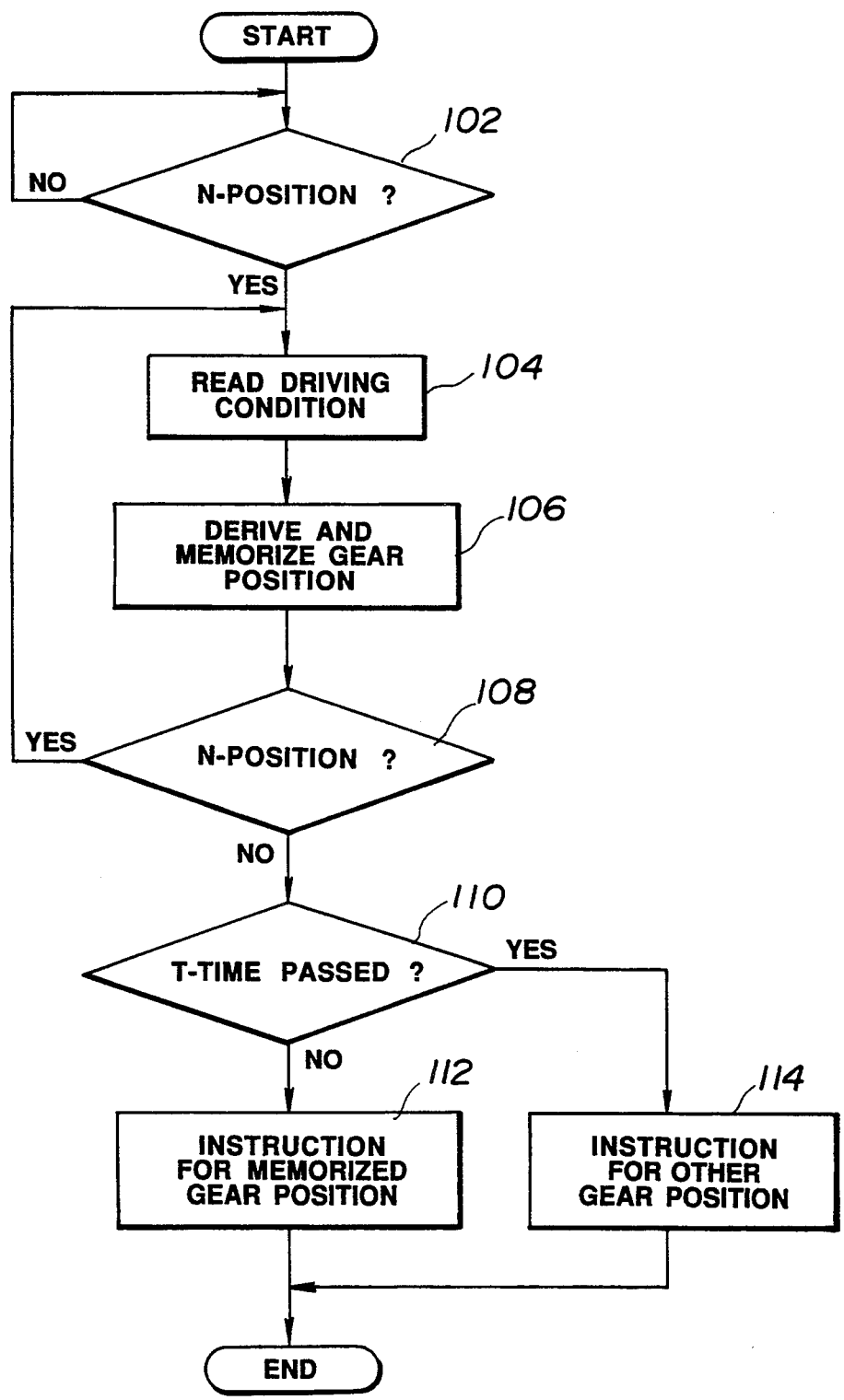
FIG. 6 is another flowchart showing operation steps which are carried out in a modification of the present invention.

Referring to FIG. 6, there is shown a flowchart depicting operation steps which are carried out in a modification of the present invention.

That is, in this modification, as step 102, a judgement is carried out as to whether a shift lever (not shown) has been moved from D-position (or any forward position) to N-position or not. If YES, that is, when the shift lever has been moved from D-position to N-position, the programmed operation flow goes to step 104. At this step, values of various factors such as vehicle speed, throttle valve angle, etc., which have been taken at the D→N shifting are read. Then, at step 106, from the values of the various factors thus read at step 104, a gear position suitable for the driving condition of the vehicle at that D→N shifting is derived and memorized. Then, at step 108, a judgement is carried out as to whether the shift lever is left at N-position or not. If YES, that is, when the shift lever is left at N-position, the operation flow returns back to step 104. Accordingly, when the shift lever is kept at N-position, the gear position suitable for the driving condition of the vehicle at that D→N shifting has been memorized without change. If NO at step 108, that is, when the shift lever has been returned to D-position, the operation flow goes to step 110 where a judgement is carried out as to whether a predetermined time T has passed or not from the time of that N→D shifting. If NO, that is, when the predetermined time has not passed, the operation flow goes to step 112 where an instruction is issued for forcing the transmission to take the memorized gear position. While, if YES at step 110, that is, when the predetermined time T has passed, the operation flow goes to step 114 where an instruction is issued for permitting the transmission to take a gear position different from the memorized gear position, that is, to take a gear position suitable for the existing driving condition of the vehicle.

It is to be noted that the predetermined time T is so selected as to obtain a smoothed restoring of the vehicle.

As is understood from the foregoing description, in the present invention, when N→D return shifting is carried out after D→N shifting, the restoring of the vehicle is smoothly made irrespective of the time for which the shift lever has been kept at N-position. That is, the N→D return shifting is smoothly carried out without suffering from uncomfortable select shock and useless racing of the engine.

Although the above description is directed to the shifting between D-position and N-position, other types of shifting are also available in the present invention, which are for example, between First (1)-position and N-position, between Second (2)-position and N-position, and the like.

What is claimed is:

1. In an automotive automatic transmission which permits a return movement of a shift lever from Neutral (N)-position to a Forward-position after a movement of the same from the Forward-position to N-position,
a control system comprising:
first means for deriving and memorizing a suitable gear position of the transmission which is to be selected under a driving condition which has been assumed by the vehicle just before said return movement of the shift lever; and
second means for forcing said transmission to take the memorized gear position upon completion of said return movement of the shift lever.

2. A control system as claimed in claim 1, in which said suitable gear position is one of gear positions which are:
a former gear position which is suitable for a driving condition which has been taken by the vehicle before the shift lever is moved from the Forward-position to N-position; and
a latter gear position which is suitable for a driving condition which has been taken by the vehicle after the shift lever is returned from N-position to the Forward-position.

3. A control system as claimed in claim 2, in which selection of one of said former and latter gear positions is achieved by measuring the time for which the shift lever is kept at N-position after the movement thereof from the Forward-position to N-position.

4. A control system as claimed in claim 3, in which when the measured time is shorter than a predetermined time, said former gear position is selected, and when the measured time is longer than the predetermined time, said latter gear position is selected.

5. In an automotive automatic transmission which permits a return movement of a shift lever from Neutral (N)-position to a Forward-position after a movement of the same from the Forward-position to N-position,
a control system comprising:
first means for deriving and memorizing a suitable gear position of the transmission which is to be selected under a driving condition which has been assumed by the vehicle just before said return movement of the shift lever;
second means for measuring the time for which the shift lever is kept at D-position after the movement of the shift lever from N-position to the Forward-position; and
third means for forcing the transmission to take the memorized gear position when the measured time is shorter than a predetermined time and for permitting the transmission to take a new gear position when the measured time is longer than the predetermined time, said new gear position being suitable to the existing driving condition of the vehicle taken after the return movement of the shift lever from N-position to the Forward-position.

* * * * *